United States Patent [19]

Stewart

[11] Patent Number: 4,514,890

[45] Date of Patent: May 7, 1985

[54] TOOL ASSEMBLY FOR REMOVAL AND INSTALLATION OF FREEZE PLUGS

[76] Inventor: Alvin E. Stewart, 2900 Hagemann, Kansas City, Kans. 66106

[21] Appl. No.: 323,282

[22] Filed: Nov. 20, 1981

[51] Int. Cl.³ .................... B23P 19/04

[52] U.S. Cl. .................... 29/256; 29/262; 29/267; 29/275

[58] Field of Search .................... 29/254, 256, 258, 259, 29/261, 262, 263, 267, 270, 275; 403/120, 148, 149, 119, 226, 372; 81/125

[56] References Cited

U.S. PATENT DOCUMENTS

| | | | |
|---|---|---|---|
| 1,332,851 | 7/1920 | Greve . | |
| 1,429,567 | 9/1922 | Carlisle | 29/262 |
| 1,433,163 | 10/1922 | Walters | 403/372 X |
| 1,473,075 | 11/1923 | Bates | 29/261 |
| 1,650,023 | 11/1927 | Maxwell | 29/262 |
| 1,650,964 | 11/1927 | Schmitt | 29/262 |
| 1,990,570 | 2/1935 | Smith | 29/262 |
| 2,018,902 | 10/1935 | Schwedland | 29/267 X |
| 2,276,344 | 3/1942 | Rodgers | 29/270 X |
| 2,322,464 | 6/1943 | McKee et al. | 29/262 |
| 2,496,672 | 2/1950 | Newman . | |
| 3,064,342 | 11/1962 | Wagoner | 29/275 |
| 3,165,950 | 1/1965 | Gooley et al. | 81/125 |
| 3,241,223 | 3/1966 | Anderson . | |
| 3,270,407 | 9/1966 | Araujo . | |
| 3,340,593 | 9/1967 | Savastano | 29/262 |
| 4,019,237 | 4/1977 | DeRee . | |
| 4,229,870 | 10/1980 | Tate | 29/254 |
| 4,274,189 | 6/1981 | Conover | 29/256 |
| 4,286,368 | 9/1981 | Magana | 29/267 |
| 4,341,004 | 7/1982 | Echols | 29/275 |

FOREIGN PATENT DOCUMENTS

| | | | |
|---|---|---|---|
| 1162286 | 9/1958 | France | 29/261 |

*Primary Examiner*—Robert C. Watson
*Assistant Examiner*—Steven P. Schad
*Attorney, Agent, or Firm*—Kokjer, Kircher, Bradley, Wharton, Bowman & Johnson

[57] ABSTRACT

The tool assembly enables installation in and removal from a combustion engine block of freeze plugs. The puller component has a plug penetrating point which is forced through the plug to define an opening. Spreader segments associated with the point can be spread laterally into engagement with the edge of the opening. Means are provided for imposing a retraction force on the segments, which cooperate to pull the plug free. A fresh plug is inserted in the freeze plug opening by utilization of an installer head shaped to releasably hold the plug during insertion in the opening after which the head can be withdrawn. Special leverage and force application arrangements are associated with the puller and installer head.

4 Claims, 13 Drawing Figures

FIG. 8
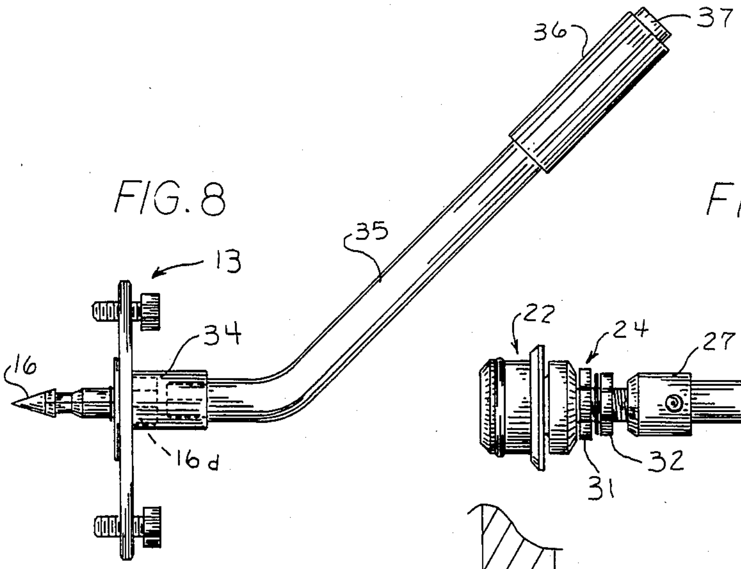
FIG 9
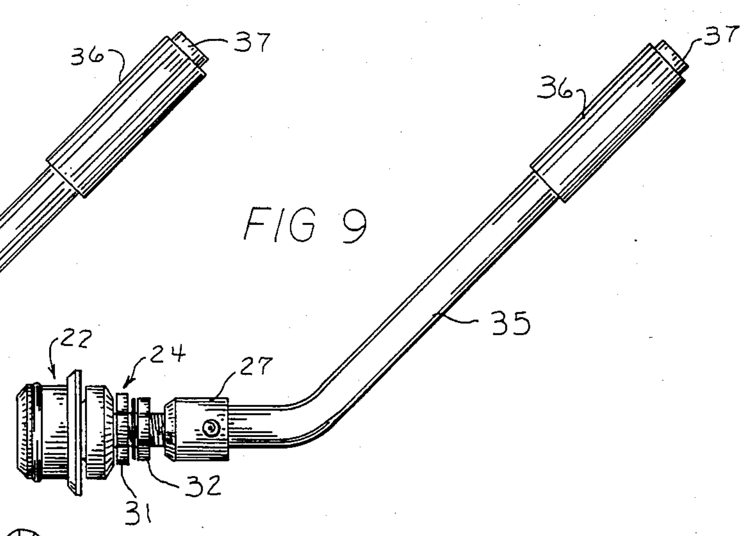
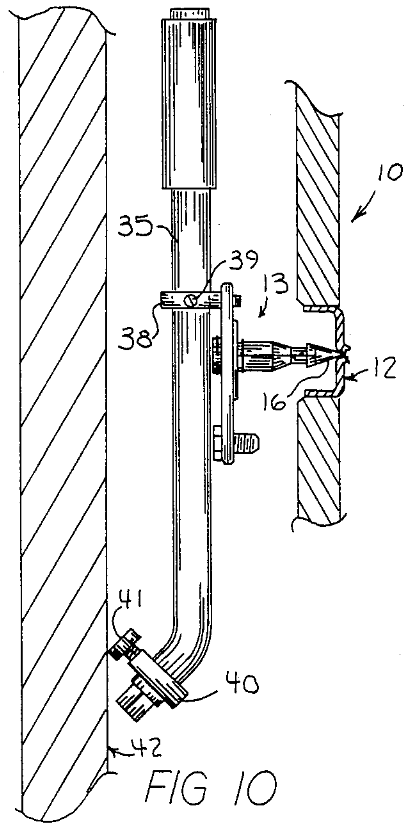
FIG 10
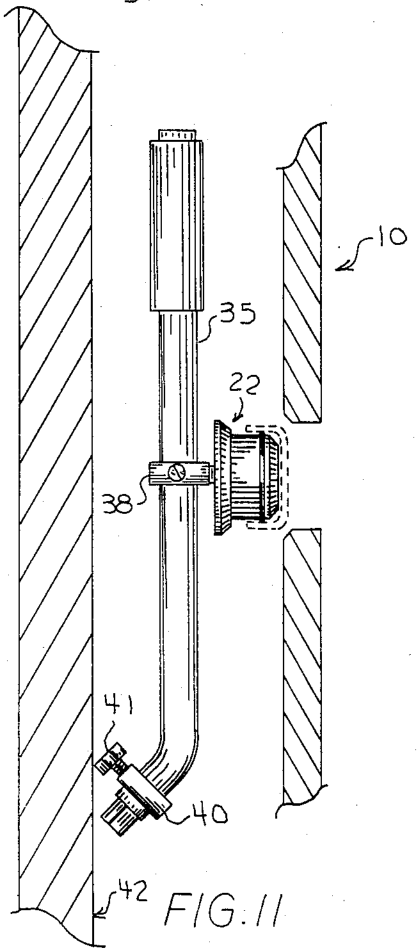
FIG. 11
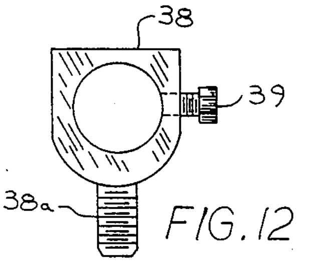
FIG. 12
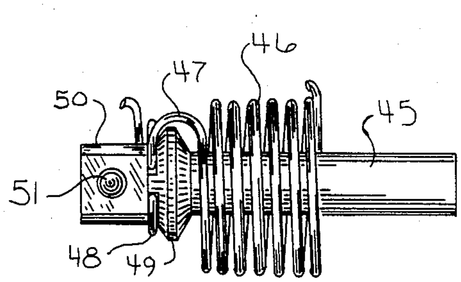
FIG. 13

TOOL ASSEMBLY FOR REMOVAL AND INSTALLATION OF FREEZE PLUGS

BACKGROUND AND SUMMARY OF THE INVENTION

This invention lies in the field of hand tools and relates more particularly to a tool assembly for enabling the removal of freeze plugs from and installation of freeze plugs in internal combustion engine blocks.

The removal of freeze plugs from and installation of such plugs in engine blocks is often a time consuming task. One of the prinicipal reasons is the confined work space available for access to the plug. Often the freeze plug opening is located very close to the vehicle firewall. It also may be partially blocked by engine accessories or other surfaces. It is therefore difficult to insert tools which are capable of doing efficient work in either removal or installation of the plug.

One of the principal objects of the present invention is to provide a multi-purpose tool assembly which, while eminently suitable for work on engines removed from the vehicle or located on workbenches or frames, has particular advantage in removing or installing plugs that are located in the confined quarters referred to above. The invention permits positioning of the plug contacting portions of the tool immediately adjacent the plug opening and a means of transmitting the plug engaging forces through a leverage arrangement which not only permits positioning of the workers hands outside the space during force application but also permits force multiplication of the hand force to the line of force exerted on the plug by means of lever action.

Another important object of the invention is to provide a tool of the character described which has considerable adaptability in dealing with freeze plug removal and installation, with reference principally to being able to work with freeze plugs which are located in various states of confined working space.

Still another object of the invention is to provide, in particular, a freeze plug puller which is in the form of a single tool head having a point section capable of being forced through the installed freeze plug and which includes a self-contained and spreadable locking arrangement through which a retraction force can be applied to the plug thus to effect the withdrawal of the pierced plug, all without requiring removal of one tool and insertion of another to effect the withdrawal. A feature of the invention in this respect is that means is also provided to achieve proper alignment of the point section of the tool head with the center portion of the freeze plug.

A further object of the invention is to provide a freeze plug installer which is so formed as to exert forces on the plug during installation which ensure both ease of insertion of the plug and effective sealing around the flange of the plug between the flange and the wall of the plug opening.

Additional objects of the invention are to provide a freeze plug tool assembly which also permits use of a pneumatic hammer in conjunction therewith; which is extremely versatile in adaptation to a wide variety of use conditions; which is relatively compact and easy to handle both in use and storage; which permits use of conventional hand tools in conjunction with its operation; and which is capable of a long useful life under conditions of hard use.

Other and further objects of the invention together with the features of novelty appurtenant thereto will appear in the course of the following description.

In the accompanying drawings which form a part of the specification and are to be read in conjunction therewith and in which like reference numerals indicate like parts in the various views;

FIG. 8 is a side elevational view of the puller component assembled with a drive handle;

FIG. 9 is a side elevational view of the installer arrangement of FIG. 6 assembled with a drive handle;

FIG. 10 is a side elevational view illustrating the puller input plug penetrating position and assembled with the handle in lever relationship;

FIG. 11 is a side elevational view illustrating the installer head in installing position and assembled with the handle in lever relationship;

FIG. 12 is a plan view of an adapter ring utilized for connecting the puller and installer components to the side of and along the handle;

FIG. 13 is a side elevational view of an adapter for a pneumatic hand hammer shaft, permitting use of the hammer in conjunction with the puller and installer components of the tool assembly.

Figure 1:
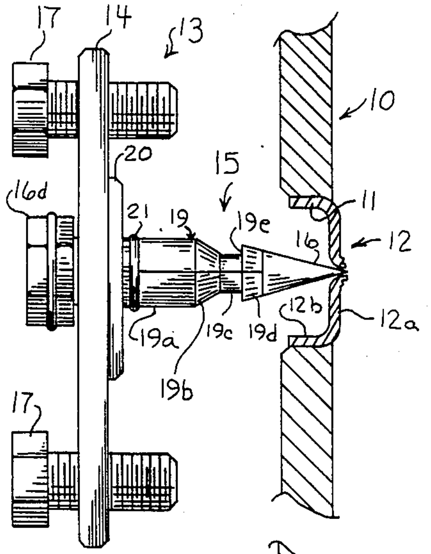
FIG. 1 is a side elevational view of the freeze plug puller component of the tool assembly, illustrating it in position for and commencing penetration of a typical freeze plug.

Reference numeral 10 indicates a typical engine block section which includes a circular freeze plug opening 11. Fitted within the freeze plug opening is the cup-shaped freeze plug 12 having the central portion **12*a* and the flanged rim 12*b*. The freeze plug 12 fits within and seals the opening 11**.

The freeze plug puller component of the tool assembly of the invention is identified generally at 13. It includes the generally elongated base plate 14 which provides a mounting support for the pointed head tool section 15, which has a conical point 16 that contacts and is employed to penetrate the central portion **12*a* of the freeze plug. The base plate 14 also is provided with threaded openings near the opposite ends which receive the shanks of bolts 17**.

Figure 2:
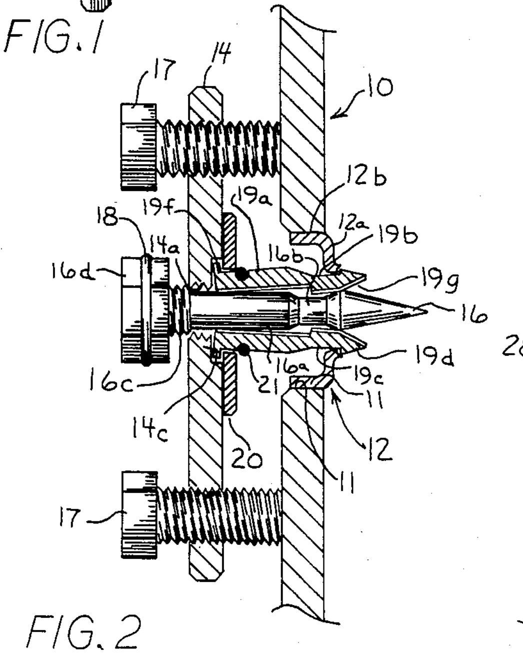
FIG. 2 is a vertical sectional view similiar to FIG. 1 but illustrating the point section of the puller in full penetrated and spread condition prior to retraction of the point and withdrawal of the plug.

As best shown in FIG. 2, the point 16 is formed as the outer end of a shaft **16*a*. The shaft is reduced in diameter to provide a reduced diameter intermediate section 16*b* located between point 16 and the main shaft section 16*a*. The other end of the shaft is provided with threads 16*c* which, as will be later explained, are during penetration of the plug engaged with the threads 14*a* formed in an opening in the plate 14. The shaft 16***a* terminates in an hexagonal head 16*d* which is circumferentially grooved to provide a mounting for a split-ring spring 18. The outer surface of the ring 18 is normally disposed radially outwardly of the corners of the hex-head 16*d* and is of somewhat greater inside diameter than the outside diameter of the groove which it is located so that it may be sprung inwardly by radially applied exterior forces. The reasons for this will be set forth later.

Closely associated with and surrounding the shaft section 16*a* and 16*b* of the point shaft are four identical segments 19 which combine to form a spreadable sleeve-like assembly. As shown in FIG. 1, in the plug piercing condition of the puller the segments fit closely around the point shaft. As may be better seen in FIG. 2, where the segments are shown in spread arrangement, the inner surfaces of the individual segments are contoured to match with the contours of the point shaft. The segment outer surface of each segment has the relatively thick base section 19*a* from which extends toward the tapered point a tapered intermediate section 19*b*. The tapered section 19*b* continues into a reduced radius section 19*c*. The outer end of each segment is in essence a conic section 19*d* having an exterior surface which forms a rearward continuation of the point 16 when the puller is in the FIG. 1 condition. A sharp annular shoulder 19*e* is formed between the conic section 19*d* and reduced radius intermediate length 19*c*.

It is important to note that the inside surface of the conic section 19*d* of each segment is inversely angled to provide a cam follower surface 19*g* which matches a conic camming surface 16*e* located between point 16 and the reduced diameter shaft section.

Figure 4:
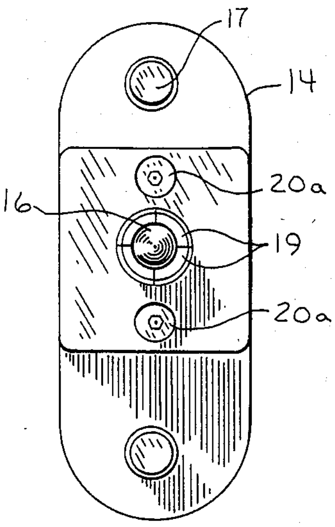
FIG. 4 is an elevational view of the puller component looking toward the point.
Figure 5:
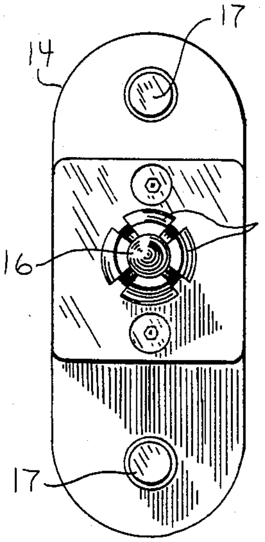
FIG. 5 is a view similiar to FIG. 4 but illustrating the point segments in their spread relationship.

At the end opposite from the point each segment 19 is provided with a radially projecting flange 19*f*. The end edges and flanges 19*f* of the segments are located in a circular recess 14*c* formed in the confronting face of the base plate 14. A retaining cover plate 20 is secured to the base plate by any suitable means, such as the Allen head screws 20*a* seen in FIGS. 4 and 5. Cover plate 20 is apertured to receive therethrough in a loose fit the segment base sections 19*a* and to provide a retaining wall preventing longitudinal displacement of the segments through the cover plate opening away from the base plate.

The segments 19 are resiliently biased radially inwardly toward the point shaft 16*a*, 16*b* by an elastic O-ring 21 located near the cover plate 20. The O-ring is received in circumferentially oriented and aligned grooves formed in the segments.

Figure 7:
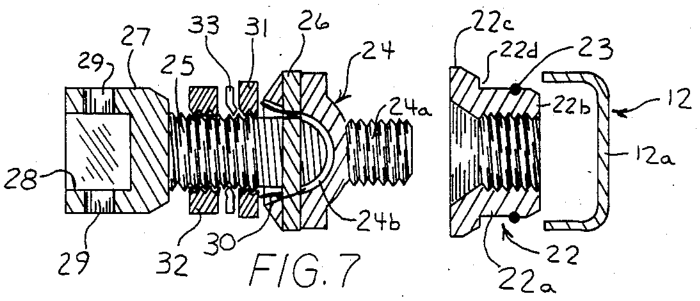
FIG. 7 is a longitudinal sectional view taken generally along line 7—7 of FIG. 6 in the direction of the arrows, the installer head and a freeze plug being illustrated in exploded relationship.
Figure 6:
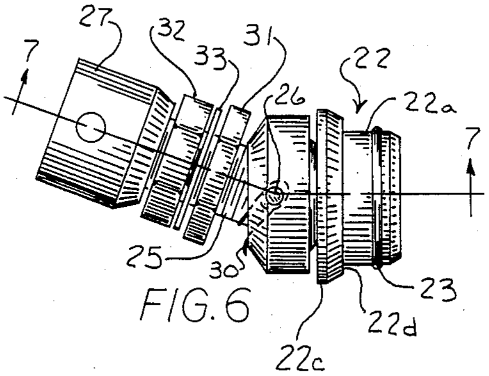
FIG. 6 is a side elevational view of the plug installer component of the tool assembly in association with a variable angle adapter sub-assembly.

The installer component of the tool assembly is illustrated in most detail in FIGS. 6 and 7 and is also shown in conjunction with other tool components in FIGS. 9 and 11.

Referring to FIGS. 6 and 7 the basic element of the installer is identified by reference numeral 22. It comprises an internally threaded body having a cylindrical exterior section 22*a* terminating in an end face 22*b*. The end edge between surface 22*a* and end face 22*b* is chamfered. At the opposite end of surface 22*a* is located an annular shoulder 22*c* forming a shoulder face 22*d*. The surface 22*a* is circumferentially grooved to receive the inner portion of an elastimeric O-ring 23. The outer portion of the O-ring projects beyond the surface 22*a*.

The length of the surface 22*a* must be such that it is adapted to receive a freeze plug 12 thereover with the inside face of the center portion of 12*a* of the plug in contact with the end face 22*b* of the installer but with the end edge of the plug flange 12*b* spaced from and not in contact with the shoulder face 22*d*. The diameter of the surface 22*a* must be slightly less than the inside diameter of the freeze plug flange 12*b* so that when the plug is fitted endwise onto the installer the O-ring will releasably retain the plug thereon through the medium of a tight friction fit between the O-ring and inside flange surface. The chamfer at the end of the installer i.e., adjacent the end face 22*b* should also be somewhat greater than the radius of curvature of the center portion and flange portion of the plug so that the only contact with any portion of the plug when the plug is fully installed on the installer is between the end face 22*b* and inside face of the center portion of the plug and between the O-ring and plug flange inside wall.

In the embodiment of FIGS. 6 and 7 the installer head 22 is threaded onto the threaded shaft 24*a* forming part of and integral with the mounting member 24. Mounting member 24 is internally recessed to provide a cavity 24*b*. One end of a threaded shaft 25 is pivotally pinned in the cavity by a cross pin 26 received through appropriate apertures in member 24. Shaft 25 is formed integral with a tool head socket 27 having the rectangular or other shaped socket or cavity 28 for reception of a tool head (not shown). Openings 29 are provided in/on opposite sides of the tool head for reception of a spring loaded blocking ball on the tool, which is conventional in the art (again not shown).

As noted earlier shaft 25 is pivotally pinned for movement relative to member 24. A torsion spring 30 is located within the socket and around the cross pin 26 and operates to yieldably bias the shaft 25 toward the position illustrated in FIG. 6. A nut 31 on shaft 25 can be adjusted toward and away from member 24 in order to adjust the angle of shaft 25 relative to member 24. When the nut 31 is fully to the right on the shaft, the shaft will be axially aligned with member 24. Moving the nut 31 outwardly permits the angle to increase. A locking nut 32 and lock washer 33 can be adjusted to secure the position of nut 31.

FIGS. 8 and 9 respectively show the puller and the installer as mounted on and operating handle. In FIG. 8 a double ended socket wrench head 34 has one end fitted over the hex head 16*d* of the puller. The other end socket of the head receives a rectangular correspondingly shaped end of the handle 35, which has a bent angular shape as shown. A hand grip 36 is at the other end of the handle and a hammer receptive tip 37 is located rearwardly of handle 36.

In the use of the puller as shown in FIG. 8, the tool is placed as illustrated in FIG. 1 and the point is forced through the plug essentially, to the position illustrated in FIG. 2. The piercing can be by hammer taps on tip 37, or other means of applying force. Once the puller point is inserted fully and the segment shoulders 19*e* are on the inside of the plug, the tool head 16*d* of the puller shaft is rotated in a direction so as to pull the point back through the plug. This causes the camming surfaces 16*e* to act on the cam follower surfaces 19*e* of the tool segments thus to force the segments radially outwardly and engage the shoulders 19*e* with the edge of the opening formed by the tool. It will be noted that the threaded section 16*e* is relatively short, preferably so that one and a half turns of the nut will result in the necessary radial separation of the segments to bring the shoulders into engagement with the edges of the opening formed in the plug. Once that has been completed, the threads are disengaged and if additional turning movements are applied the point shaft 16*a* will simply rotate without causing any further expansion.

When the segment shoulders are engaged the plug can then be withdrawn by turning the bolts 17 (using a wrench or other tool) so that the ends make contact with the block exterior and thereafter move the tool frame 14 outwardly away from the block. This carries the freeze plug outwardly also and results in its ultimate removal from the plug opening. The plug can then be removed from the tool by rethreading shaft 16 back into the frame and moving the point forwardly to permit the segments to retract into their original position under the influence of O-ring 21.

A new plug can be installed utilizing the arrangement of FIG. 9. The plug is fitted over the installer head 22 as earlier described. The plug is then placed adjacent the opening and can be gently forced into position by utilization of pressure applied to the handle 35. The angle of the handle relative to the head can be adjusted through the positioning of the adjusting nut 31, also as earlier described.

FIGS. 10 and 11 show alternative ways for positioning and manipulating the puller and installer.

As shown in FIG. 10 the puller 13 can be mounted to the side of the handle through the use of an adapter mounting ring 38 details of which are shown in FIG. 12. Ring 38 has a set screw 39 which permits adjustment along the handle shaft. It also has a threaded shaft 38*a* having the same size and thread arrangement as the bolts 17. One bolt 17 is removed and the puller frame 14 attached to the adapter ring. The handle has a second adapter ring 40 near the tip which includes an adjustable bolt 41 adapted to be engaged with the firewall 42.

The puller is positioned as shown and then forced through the plug as previously described by exerting a leverage force on the handle. Once the puller point is inserted the handle can be manipulated to expose the puller tool head 16*d* and the puller operated to spread the puller segments. Once spread a retraction force can be applied by applying leverage in a direction reverse from that of installation. This arrangement obviously permits work in a closely confined space.

Essentially the same procedure but in reverse is employed in utilization of the installer head as shown in FIG. 11. The installer head 22 is secured to the handle by the ring 38, the plug is placed on the installer head, the handle positioned as shown and force applied to press the plug into its installed position. Obviously the position of the installer along the shaft can be changed as desired.

Figure 3:
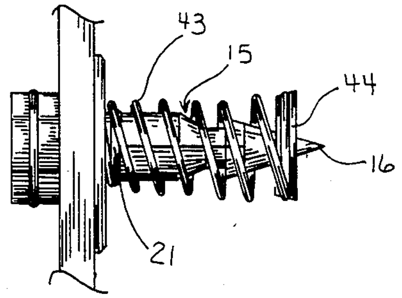
FIG. 3 is a fragmentary view similar to FIG. 1 but showing also the resiliently collapsable point guide attachment.

FIG. 3 illustrates an optional addition to the puller which comprises a helical resilient coil spring 43 encircling the pointed tool section 15 of the puller. One end of the spring fits tightly over the O-ring 21 and the spring increases in diameter toward the outer end so as not to interfere with the tool operation. At the outer end adjacent the point the spring terminates in a flat ring having an end face 44. The ring 44 can be used to aid in positioning the tool, i.e., in that it serves to guide the point of the tool toward the center portion and away from the edge of the plug. The spring construction permits insertion of the point to the necessary depth to initiate retraction of the plug. The spring can be slipped on and off the tool as desired.

FIG. 13 illustrates still another accessory which permits utilization of either the puller or the installer with a conventional hand held pneumatic gun type hammer. (Not shown). Such hammers are adapted to receive a shaft like shaft 45 and connect with a spring 46. Spring 46 is a helical spring which terminates in a looped portion 47 which provides a generally U-shaped section 48 which fits within a groove formed adjacent a radial flange 49 formed as part of the shaft 45. Shaft 45 is a guide shaft and the spring 46 being connected with the gun and with the shaft through the U-shaped connection permits the hammer to drive the tool head 50 formed at the end of the shaft. Tool head 50 is equipped with a resiliently outwardly biased ball 51 forming a part of the tool head 50 in the conventional manner.

When the adapter of FIG. 13 is utilized, the tool head 50 (which is a hex or other typical tool head) is inserted in socket 34 or socket 27 (FIGS. 8 and 9) as an alternative to the hand levers 35. The pneumatic hammer then can be employed conventionally, either to drive the puller into its pulling position or to operate the installer head 22 to insert the plug. Ball 51 engages in one of the sockets 29 to releasably lock the gun adapter head 52 the socket.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described my invention, I claim:

1. A tool for pulling a freeze plug from an engine block comprising:

a shaft member terminating at one end in a tapered point for piercing a plug and forming an opening therein, a frame supporting said shaft at a location on said shaft remote from said point, means for moving said shaft longitudinally relative to said frame responsive to rotation of said shaft, cooperating spreadable segments surrounding said shaft and associated with said point, resilent means biasing said segments inwardly toward said shaft in a retracted condition during piercing of the plug, said segments anchored at one end to said frame and free to move laterally outwardly relative to said shaft at the other end and having plug engaging shoulders adapted to engage the plug around the opening and resist withdrawal of the segments through the opening once the plug has been pierced, a resilient, longitudinally collapsible member encircling said shaft and segments and having a ring-like guide member at one end encircling and adjacent said point, cooperating camming means on said shaft and said segments operable to spread said segments away from said shaft in response to longitudinal movement of said shaft, and means for applying force to said frame thereby to displace same and cause the plug to be pulled from the opening by the engaged segments.

2. An installer for installing a freeze plug in a freeze plug opening in an engine block comprising, head portion insertable in and for forcing said plug into said opening, said head portion having an internal cavity with an open end facing the direction opposite from the plug, said open end having an edge, means for releasably holding said plug to said head portion and permitting said head to be withdrawn from the plug end opening when the plug has been installed, force transmission means connected with said head, said force transmission means being angularly adjustable with respect to the head portion thereby to vary the direction of a line of force applied to the head through the force transmission means, said force transmission means including (a) a shaft extending endwise into said cavity through said open end, (b) means pivotally securing the shaft within said cavity, (c) resilient means urging said shaft toward one side of the cavity, and (d) means adjustable along said shaft for engaging said edge so as to vary the angle of the shaft in the cavity when the shaft is in its resiliently biased position.

3. A tool for pulling a freeze plug from an engine block comprising:

a shaft member terminating at one end in a tapered point for piercing a plug and forming an opening therein, a frame supporting said shaft at a location on said shaft remote from said point, means for moving said shaft longitudinally relative to said frame responsive to rotation of said shaft, cooperating spreadable segments surrounding said shaft and associated with said point, resilent means biasing said segments inwardly towards said shaft in a retracted condition during piercing of the plug, said segments anchored at one end to said frame and free to move laterally outwardly relative to said shaft at the other end having plug engaging shoulders adapted to engage the plug around the opening and resist withdrawal of the segments through the opening when they have passed through the opening in the direction of piercing of the plug, cooperating camming means on said shaft and said segments operable to spread said segments away from said shaft in response to longitudinal movement of said shaft relative to said frame, and means for applying force to said frame thereby to displace same and cause the plug to be pulled from the opening by the engaged segments.

4. A tool as in claim 3, said segments including outer surfaces adjacent said point which form a continuation of the tapered point surfaces when the segments are in the retracted condition, said shoulders being adjacent said last named surfaces.

* * * * *